(12) United States Patent
Cherkasova et al.

(10) Patent No.: US 7,779,127 B2
(45) Date of Patent: Aug. 17, 2010

(54) SYSTEM AND METHOD FOR DETERMINING A SUBSET OF TRANSACTIONS OF A COMPUTING SYSTEM FOR USE IN DETERMING RESOURCE COSTS

(75) Inventors: Ludmila Cherkasova, Fort Collins, CO (US); Qi Zhang, Fort Collins, CO (US); Guy Mathews, Fort Collins, CO (US); Wayne Greene, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 830 days.

(21) Appl. No.: 11/684,567

(22) Filed: Mar. 9, 2007

(65) Prior Publication Data

US 2008/0221911 A1    Sep. 11, 2008

(51) Int. Cl.
G06F 15/16 (2006.01)
G06F 15/173 (2006.01)
G06F 9/46 (2006.01)

(52) U.S. Cl. .................... 709/226; 709/205; 718/104
(58) Field of Classification Search ......... 709/202–207, 709/217–238; 718/102–107
See application file for complete search history.

(56) References Cited

U.S. PATENT DOCUMENTS

| | | | | | |
|---|---|---|---|---|---|
| 4,849,879 | A | * | 7/1989 | Chinnaswamy et al. | 706/45 |
| 5,446,874 | A | * | 8/1995 | Waclawsky et al. | 714/1 |
| 5,544,310 | A | * | 8/1996 | Forman et al. | 714/31 |
| 5,644,717 | A | * | 7/1997 | Clark | 709/224 |
| 5,655,081 | A | * | 8/1997 | Bonnell et al. | 709/202 |
| 5,732,218 | A | * | 3/1998 | Bland et al. | 709/224 |
| 5,742,754 | A | * | 4/1998 | Tse | 714/38 |
| 5,781,449 | A | * | 7/1998 | Rosborough | 709/224 |
| 5,781,703 | A | * | 7/1998 | Desai et al. | 706/50 |
| 5,787,254 | A | * | 7/1998 | Maddalozzo et al. | 709/228 |
| 5,812,780 | A | * | 9/1998 | Chen et al. | 709/224 |
| 5,819,066 | A | * | 10/1998 | Bromberg et al. | 1/1 |
| 5,864,662 | A | * | 1/1999 | Brownmiller et al. | 714/43 |
| 5,905,868 | A | * | 5/1999 | Baghai et al. | 709/224 |
| 5,964,891 | A | * | 10/1999 | Caswell et al. | 714/31 |
| 6,006,260 | A | * | 12/1999 | Barrick et al. | 709/224 |
| 6,108,700 | A | * | 8/2000 | Maccabee et al. | 709/224 |
| 6,108,782 | A | * | 8/2000 | Fletcher et al. | 713/153 |
| 6,138,157 | A | * | 10/2000 | Welter et al. | 709/224 |
| 6,157,618 | A | * | 12/2000 | Boss et al. | 370/252 |
| 6,157,940 | A | * | 12/2000 | Marullo et al. | 703/27 |
| 6,167,534 | A | * | 12/2000 | Straathof et al. | 714/38 |
| 6,205,413 | B1 | * | 3/2001 | Bisdikian et al. | 703/24 |
| 6,216,169 | B1 | * | 4/2001 | Booman et al. | 709/246 |
| 6,243,105 | B1 | * | 6/2001 | Hoyer et al. | 345/440 |
| 6,324,492 | B1 | * | 11/2001 | Rowe | 703/13 |
| 6,336,138 | B1 | * | 1/2002 | Caswell et al. | 709/223 |

(Continued)

Primary Examiner—Asad M Nawaz

(57) ABSTRACT

A method comprises receiving a representative workload of a computing system, where the representative workload comprises a plurality of composite transactions. In certain embodiments, the representative workload is a historical workload of a computing system. In general, a composite transaction refers to a transaction that comprises a plurality of embedded transactions. The method further comprises determining a subset of the plurality of composite transactions for which a corresponding resource cost is to be determined; and determining, based at least in part on a statistical regression-based analysis, a resource cost for the composite transaction(s) in the determined subset, where the resource cost reflects an amount of utilization of at least one resource of the computing system in serving the composite transaction(s).

19 Claims, 6 Drawing Sheets

U.S. PATENT DOCUMENTS

| | | | |
|---|---|---|---|
| 6,411,998 B1 * | 6/2002 | Bryant et al. | 709/224 |
| 6,434,513 B1 * | 8/2002 | Sherman et al. | 702/186 |
| 6,446,028 B1 * | 9/2002 | Wang | 702/186 |
| 6,446,120 B1 * | 9/2002 | Dantressangle | 709/224 |
| 6,449,739 B1 * | 9/2002 | Landan | 714/47 |
| 6,457,142 B1 * | 9/2002 | Klemm et al. | 714/38 |
| 6,470,464 B2 * | 10/2002 | Bertram et al. | 714/37 |
| 6,477,483 B1 * | 11/2002 | Scarlat et al. | 702/186 |
| 6,505,246 B1 * | 1/2003 | Land et al. | 709/224 |
| 6,519,714 B1 * | 2/2003 | Sweet et al. | 714/28 |
| 6,606,658 B1 * | 8/2003 | Uematsu | 709/225 |
| 6,643,613 B2 * | 11/2003 | McGee et al. | 702/186 |
| 6,694,288 B2 * | 2/2004 | Smocha et al. | 702/186 |
| 6,738,933 B2 * | 5/2004 | Fraenkel et al. | 714/47 |
| 7,401,143 B2 * | 7/2008 | Oulu et al. | 709/224 |
| 7,424,530 B2 * | 9/2008 | Chagoly et al. | 709/224 |
| 7,434,204 B1 * | 10/2008 | Everingham et al. | 717/120 |
| 7,437,450 B1 * | 10/2008 | Gore et al. | 709/224 |
| 7,499,994 B2 * | 3/2009 | Sapiro et al. | 709/224 |
| 7,505,415 B2 * | 3/2009 | Murgatroyd et al. | 370/241 |
| 7,506,044 B2 * | 3/2009 | Doshi et al. | 709/223 |
| 7,565,610 B2 * | 7/2009 | Li et al. | 715/736 |
| 7,636,711 B2 * | 12/2009 | Rizzi et al. | 1/1 |
| 7,640,342 B1 * | 12/2009 | Aharoni et al. | 709/226 |
| 7,657,499 B2 * | 2/2010 | Newman et al. | 1/1 |
| 7,673,191 B2 * | 3/2010 | Addleman et al. | 714/57 |
| 7,676,706 B2 * | 3/2010 | Addleman et al. | 714/57 |
| 7,698,417 B2 * | 4/2010 | Rizzi et al. | 709/224 |
| 7,711,803 B2 * | 5/2010 | Doshi et al. | 709/223 |
| 7,725,572 B1 * | 5/2010 | Kautzleben | 709/224 |
| 7,730,051 B2 * | 6/2010 | Falardeau et al. | 707/707 |
| 7,734,763 B2 * | 6/2010 | Budzisch et al. | 709/224 |
| 7,734,775 B2 * | 6/2010 | Barnett et al. | 709/224 |
| 2002/0083371 A1 * | 6/2002 | Ramanathan et al. | 714/37 |
| 2002/0099816 A1 * | 7/2002 | Quarterman et al. | 709/224 |
| 2002/0105911 A1 * | 8/2002 | Pruthi et al. | 370/241 |
| 2002/0120727 A1 * | 8/2002 | Curley et al. | 709/223 |
| 2002/0138226 A1 * | 9/2002 | Doane | 702/119 |
| 2003/0065702 A1 * | 4/2003 | Singh et al. | 709/105 |

* cited by examiner

SYSTEM AND METHOD FOR DETERMINING A SUBSET OF TRANSACTIONS OF A COMPUTING SYSTEM FOR USE IN DETERMING RESOURCE COSTS

CROSS-REFERENCE TO RELATED APPLICATIONS

This application is related to concurrently filed and commonly assigned U.S. patent application Ser. No. 11/684,563 entitled "REGRESSION-BASED SYSTEM AND METHOD FOR DETERMINING RESOURCE COSTS FOR COMPOSITE TRANSACTIONS", and concurrently filed and commonly assigned U.S. patent application Ser. No. 11/684,569 entitled "SYSTEM AND METHOD FOR CAPACITY PLANNING FOR COMPUTING SYSTEMS", the disclosures of which are hereby incorporated herein by reference.

TECHNICAL FIELD

The following description relates generally to capacity planning for computer systems, and more particularly to systems and methods for determining a subset of composite transactions included an a representative workload of a computing system for use in determining resource costs of the computing system for serving such composite transactions.

DESCRIPTION OF RELATED ART

Today, computer systems are delivering (e.g., via computer networks, such as the Internet) a large array of business, government, and personal services. Similarly, mission critical operations, related to scientific instrumentation, military operations, and health services, are making increasing use of computer systems and computer networks for delivering information and distributed coordination. For example, many users are accessing service providers' computer systems via the Internet seeking such services as personal shopping, airline reservations, rental car reservations, hotel reservations, on-line auctions, on-line banking, stock market trading, as well as many other services being offered by service providers via computer networks, such as the Internet. Therefore, many service providers are competing in such electronic forum. Accordingly, it is important for such service providers (sometimes referred to as "content providers") to provide high-quality services. To do so, it has become desirable for such service providers to perform appropriate capacity planning to ensure that they can adequately service the demands placed on their systems by their clients in a desired manner (e.g., provide responses to requests in sufficiently fast time, etc., such as by serving responsive web pages to a requesting client within 8 seconds and/or satisfy some other quality of service target).

As information technology ("IT") and application infrastructures, such as those employed by the above-mentioned service providers for serving their clients, have become more complex, predicting and controlling the issues surrounding system performance and capacity planning have become a difficult (and sometimes overwhelming) task to many organizations. For larger IT projects, it is not uncommon for the cost factors related to performance tuning, performance management, and capacity planning to result in the largest and least controlled expense. Application performance issues have an immediate impact on customer satisfaction. A sudden slowdown of an enterprise-wide application can affect a large population of customers, can lead to delayed projects, and ultimately can result in company financial loss.

Large-scale enterprise development projects are increasingly relying on Service-Oriented Architecture (SOA) design. This approach provides a collection of mechanisms and interfaces for a dynamic enterprise IT environment to connect applications where the classic, data-processing legacy systems can be integrated with agile web-based front-end applications. Application servers have emerged to provide a standardized platform for developing and deploying scalable enterprise systems. The application servers are often considered a core component of an enterprise system and all integral part of a new trend toward building SOAs.

Multi-tier architectures are also commonly being employed. For instance, the three-tier a architecture paradigm has become an industry standard for building scalable client-server applications. In a typical three-tier architecture for an application, the application comprises the following three tiers: 1) an interface tier (sometimes referred to as the presentation tier), 2) an application tier (sometimes referred to as the logic or business logic tier), and 3) a data tier (e.g., database tier). The first tier provides a user interface, such as a graphical user interface (GUI), with which the user may interact with the other tiers. The second tier provides functional process logic, which may comprise one or more separate modules running on a workstation or application server, for example. The application tier may, in some implementations, be multi-tiered itself (in which case the overall architecture may be called an "n-tier architecture"). The third tier manages the storage and access of data for the application. Typically, a relational database management system (RDBMS) on a database server or mainframe contains the data storage logic of the third tier. The three tiers are developed and maintained as independent modules, often on separate platforms. Quite often the first and second tiers may be implemented on common hardware (i.e., on a common platform), while the third tier is implemented on a separate platform, but any arrangement of the three tiers (i.e., either on common hardware or across separate hardware) may be employed in a given implementation. The three-tier architecture is generally intended to allow any of the three tiers to be upgraded or replaced independently as requirements, desires, and/or technology exchange. For example, a change of operating system from Microsoft Window™ to Unix™ may only affect the user interface code.

As an example, suppose that a service provider develops a web application that provides banking services to clients via the web. In this example, the banking application may comprise a user interface tier that defines the user interface with which the clients interact to perform desired banking transactions. The banking application may further comprise an application tier that defines the business logic and functionality of the banking application. The banking application may further comprise a data tier that is operable to manage access of the clients' respective account balance data, for example. In such multi-tiered systems, frequent calls to application servers and data storage (e.g., databases) may place a heavy load on these resources and may cause throughput bottlenecks and high server-wide processing latency.

Traditionally, preliminary system capacity estimates are performed for service provider systems by using synthetic workload or benchmarks which are created to reflect a "typical application behavior" for "typical client requests". While this performance evaluation approach can be useful at the initial stages of design and development of a future system, it is often inadequate for answering more specific questions about an existing system that is deployed in a service provider's environment. In many cases, the workload actually encountered by a deployed system does not correspond with the synthetic workload that was expected for the system, and thus the preliminary system capacity estimates may be inadequate. Further, the techniques used for arriving at the preliminary system capacity estimates are unable to answer specific capacity planning questions that a given service provider may have about the capacity of the deployed system. Further still, evaluating the capacity of a deployed system based on a representative workload of the deployed system, such as an actual historical workload encountered by the deployed system, may be difficult and/or compute-intensive, particularly when the representative workload includes composite transactions. In general, a composite transaction refers to a transaction that comprises a plurality of transactions. For instance, a given transaction for serving a client's request for information (e.g., a web page) may include embedded therein a plurality of requests/responses for objects (e.g., images, etc.) that form the information (e.g., that form the requested web page), and thus the given transaction for serving the information may be considered a composite transaction as it involves various transactions for serving the objects that form such information. Determining a resource cost associated with serving such composite transactions may be desired for evaluating capacity of a computing system, but techniques for so determining such resource costs, particularly in a manner that is not compute prohibitive, are lacking in traditional capacity planning systems.

DETAILED DESCRIPTION

Figure 1:
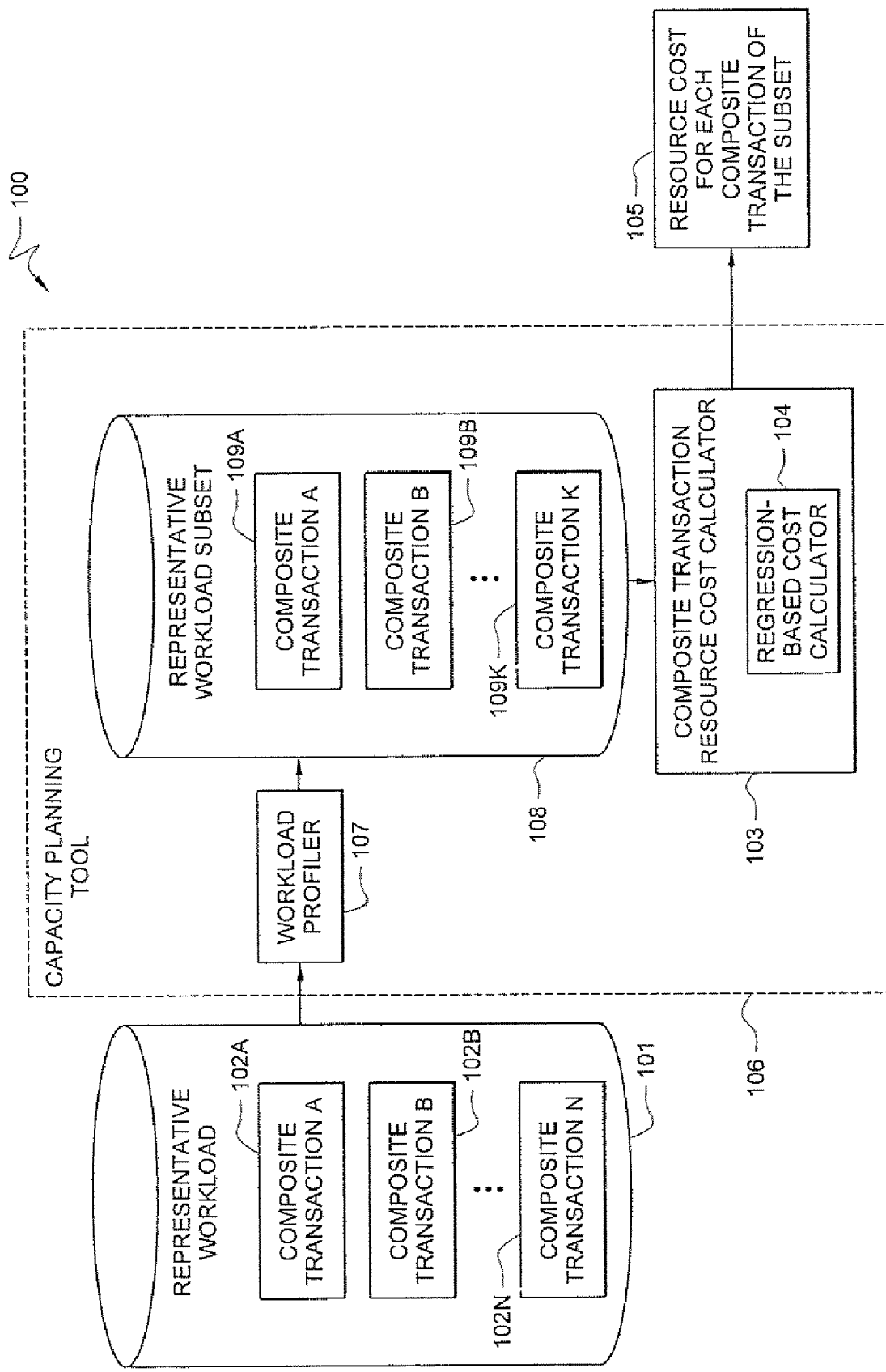
FIG. 1 shows an exemplary system according to an embodiment of the present invention.

Various embodiments of the present invention are now described with reference to the above figures, wherein like reference numerals represent like parts throughout the several views. As described further below, the present invention provides systems and methods for determining a subset of composite transactions of a computing system for use in determining resource costs for serving such subset of transactions. As described further below, such resource costs reflect an amount of utilization of at least one resource (e.g., CPU utilization) of the computing system for serving a corresponding composite transaction. According to certain embodiments, a regression-based system and method for determining resource costs associated with serving the subset of composite transactions, such as the exemplary regression-based systems and methods described in co-pending and commonly assigned U.S. patent application Ser. No. 11/684,563 entitled "REGRESSION-BASED SYSTEM AND METHOD FOR DETERMINING RESOURCE COSTS FOR COMPOSITE TRANSACTIONS", the disclosure of which is incorporated herein by reference. The determined resource costs associated with serving the subset of transactions may in turn be used for performing capacity analysis of the computing system, such as analyzing the capacity of the computing system for serving an increased population of clients that act similar to the system's current population of clients, etc.

As described further below, in certain embodiments, a representative workload of a system under analysis e.g., a service provider's deployed system) is received, which contains a plurality of composite transactions. The representative workload may, in some embodiments, be data representing an actual historical workload encountered by the system under analysis. Thus, embodiments of the present invention may be employed to analyze a "live" workload of a deployed system, which may enable more accurate analysis and planning for the system beyond the traditional preliminary system capacity estimates mentioned above. In certain embodiments, a subset of the composite transactions included in the representative workload is determined. As described further herein, such subset may be determined as the most popular composite transactions in the representative workload. That is, those composite transactions that occur most frequently within the representative workload may be identified to form the subset of composite transactions.

The exemplary regression-based systems and methods described in co-pending and commonly assigned U.S. patent application Ser. No. 11/684,563 entitled "REGRESSION-BASED SYSTEM AND METHOD FOR DETERMINING RESOURCE COSTS FOR COMPOSITE TRANSACTIONS" provide techniques for accurately and efficiently determining resource costs associated with various composite transactions included in a representative workload. However, in some instances, the efficiency and/or accuracy of the capacity planning analysis can be improved by focusing the analysis more heavily on a determined subset of most popular composite transactions in the representative workload. For instance, a typical web service and its web site can support hundreds or thousands of distinct web pages and links. Finding a solution for a large number of equations with large number of variables results in a high complexity of regression method and correspondingly a high computing time. Workload analysis has shown the inventors of the present invention that the typical web workload exhibits a very high degree of reference locality, where a relatively small subset of site transactions is responsible for a very high percentage of client accesses. Such reference locality may likewise exist in computing environments other than web service environments, and thus application of the concepts described herein are not limited to web workloads but may be likewise applied in addition or instead to other types of workloads. Thus, certain embodiments of the present invention actively exploit the locality available in such workloads to provide an optimized technique for efficiently and accurately determining resource costs for composite transactions, wherein such determined resource costs may in turn be used for performing capacity planning analysis.

In this manner, according to certain embodiments, a subset of the composite transactions included in a representative workload of a service provider's computing system may be determined and used for determining the resource costs associated with serving the composite transactions included in such subset. The subset of composite transactions may be identified, for example, as the most popular transactions that are performed in the representative workload. For instance, in certain embodiments, a popularity threshold may be defined, wherein such popularity threshold may establish a cutoff for determining the most popular (e.g., the most frequently served) composite transactions in the representative workload. As an example, those composite transactions that make up 90% (or some other threshold amount) of resource utilization of a workload may be determined as the most popular composite transactions. As another example, those transactions that occur most frequently may be determined as the most popular composite transactions. For instance, the composite transactions appearing in the representative workload may be ordered based on frequency of occurrence in the representative workload, and the top 10, 15, 20, 50, 100, and/or other number of most popular composite transactions may be selected as the most popular subset to use in the further analysis. Thus, the received representative workload may be analyzed to determine those composite transactions that exceed a defined popularity threshold, wherein such composite transactions that exceed the defined popularity threshold form a subset of composite transactions that are used for computing corresponding resource costs associated with each of such subset of composite transactions.

In certain embodiments, it is recognized that rarely-encountered composite transactions included in a representative workload may form a level of "noise" that if taken into consideration for capacity planning may lead to inefficiency and/or inaccurate results. For instance, resource costs of rarely occurring composite transactions may distort the capacity planning analysis to account for such composite transactions when such composite transactions may occur so infrequently that the capacity planning analysis should not be based heavily on the resource costs thereof. Certain embodiments of the present invention recognize that some amount of such "noise" attributable to relatively rarely encountered composite transactions may be present over various periods of analysis. Although, the specific rare transactions that cause such "noise" may differ from one period to the next. For example, in an online banking application, certain composite transactions such as viewing account balances, performing transfers of amounts between accounts, etc. may be popular transaction types that occur frequently, while other types of composite transactions such as applying for a mortgage, requesting a credit report, etc., may occur much less frequently. Further, in a first monitoring window of time during which the online banking application is analyzed, the most popular transaction account types may be present along with an occurrence of certain rare transaction types, such as a mortgage application in the above example; whereas in a second monitoring window of time, the most popular transaction account types may again be present along with an occurrence of certain other rare transaction types, such as a request for a credit report in the above example. Accordingly, in certain embodiments, an additional amount of cost is included in the determined resource cost for the subset of composite transactions to account for an amount of additional noise that may likely be encountered during a given period due to some rarely encountered transactions. In this manner, the resource cost determination can be more accurate because it is based heavily on the most popular subset of composite transactions that are likely to be encountered by the computing system while also permitting an ability to account for a certain amount of additional "noise" that is likely to be encountered due to rarely encountered transactions.

Further, in certain embodiments, the resource costs may be determined for different tiers of a multi-tier architecture. Thus, exemplary embodiments are disclosed that enable a resource cost (e.g., CPU cost) of different client transactions at different tiers to be determined (e.g., approximated). Further, in certain embodiments, the determined resource costs may be further analyzed for performing planning, such as for answering capacity planning questions about the computing system under analysis. Thus, in certain embodiments, the determined cost functions may be used for evaluating the resource requirement of a scaled or modified transaction workload mix in order to accurately size the future system, for example.

FIG. 1 shows an exemplary system 100 according to an embodiment of the present invention. As shown in this example, a representative workload 101 comprises a plurality of composite transactions, such as composite transactions 102A-102N (referred to collectively herein as composite transactions 102). In general, a composite transaction refers to a transaction that comprises a plurality of transactions. For instance, a given transaction for serving a client's request for information (e.g., a web page) may include embedded therein a plurality of requests/responses for objects (e.g., images, etc.) that form the information (e.g., that form the requested web page), and thus the given transaction for serving the information may be considered a composite transaction as it involves various transactions for serving the objects that form such information. A more detailed example of a composite transaction is described further below with reference to FIG. 2.

In the exemplary embodiment of FIG. 1 representative workload 101 may be an actual historical workload collected for a service provider (referred to herein as a "live workload"), for example. That is, representative workload 101 may comprise data representing an actual historical workload collected for a system under analysis over a given period of time, say a preceding 3-month period for example. Representative workload 101 may comprise data stored to a computer-readable medium, such as memory, hard drive, peripheral data storage drive, optical data storage (e.g., CD, DVD, etc.), magnetic data storage, tape storage, etc. Representative workload 101 may be stored in the form of any suitable data structure, such as to a database, file, table, etc. Again, in certain embodiments, such data may represent an actual historical workload of the service provider's computing system.

The representative workload data 101 may be collected through well-known application logs and system usage metrics, such as CPU utilization measured at a defined time scale (e.g., 5 minutes or so). As one example, the data collected in access logs generated by Hewlett-Packard's Open View Service Desk (OVSD) application server may be used in forming representative workload 101. Other types of access logs, which may be customized for their respective applications, may be used in accordance with embodiments of the present invention. As an illustrative example, such access logs typically collect such data as the following for each transaction:

date and a time stamp of the request, session ID, transaction URL, and referrer field. According to one embodiment of the present invention, the timestamp, session ID, and transaction URL fields of the access log are used for the analysis.

System 100 further comprises a workload profiler 107, which receives representative workload 101 and determines a subset 108 thereof. That is, workload profiler employs techniques, such as those described further herein, to determine a subset 108 of the "K" most popular composite transactions 109A-109K (referred to collectively herein as composite transactions 109) of representative workload 101. Once determined, subset 108 may be stored to a computer-readable medium, such as memory, hard drive, peripheral data storage drive, optical data storage (e.g., CD, DVD, etc.), magnetic data storage, tape storage, etc. The subset 108 and/or composite transactions 109 thereof may be stored in the form of any suitable data structure, such as to a database, file, table, etc.

Exemplary system 100 further comprises a composite transaction resource cost calculator ("CTRCC") 103, which receives the determined subset 108. Such CTRCC 103 is operable to analyze the received subset 108 and determine a corresponding resource "cost" 105 for each of the composite transactions 109. In general, the resource cost of a composite transaction reflects an amount of utilization of at least one resource in serving the composite transaction. For example, the resource cost that is computed in certain embodiments is a CPU cost, which is reflective of an amount of CPU utilization attributable to serving the corresponding composite transaction. In certain embodiments, such CPU utilization may be a corresponding amount of CPU utilization of a given tier of multi-tier architecture that is attributable to serving the corresponding composite transaction.

In certain embodiments, workload profiler 107 may periodically receive a representative workload 101 for a service provider and determine the subset 108 of most popular composite transactions contained within the representative workload 101; and CTRCC 103 may receive such determined subset 108 to provide an analysis of resource costs 105 for the transactions 109 included in such subset 108. For instance, workload 101 may, in some embodiments, be a historical workload encountered by the service provider's system (e.g., over the preceding 3-month period), and workload profiler 107 and CTRCC 103 may therefore provide an updated analysis over time as the number of clients supported by the service provider and/or the client activities may change over time.

As described further herein, in certain embodiments, CTRCC 103 employs a regression-based solver 104 for determining the resource cost 105 for the subset 108 of composite transactions 109. An exemplary statistical regression-based analysis that may be employed by such regression-based solver 104 is described further below in connection with FIG. 4. In certain embodiments, the representative workload 101 and/or subset 108 may comprise certain transactions that are not composite transactions, and CTRCC 103 may also be operable to determine a resource cost for such non-composite transactions.

Workload profiler 107, CTRCC 103 and/or regression-based solver 104 may be implemented as computer-executable software code stored to a computer-readable medium and/or as hardware logic, as examples. Once determined, resource cost 105 may be stored to a computer-readable medium, such as memory, hard drive, peripheral data storage drive, optical data storage (e.g., CD, DVD, etc.), magnetic data storage, tape storage, etc. The resource cost 105 may be stored in the form of any suitable data structure, such as to a database, file, table, etc.

In certain embodiments, workload profiler 107 and/or CTRCC 103 is implemented as part of a capacity planning tool 106. In certain embodiments, such a capacity planning tool 106 may be operable to further analyze computed resource costs 105 to provide capacity planning analysis for the system under analysis, such as by answering certain capacity planning questions that the service provider may have, such as discussed further below in connection with FIG. 5. Such capacity planning tool 106 may be implemented as computer-executable software code stored to a computer-readable medium and/or as hardware logic, as examples.

Figure 2:
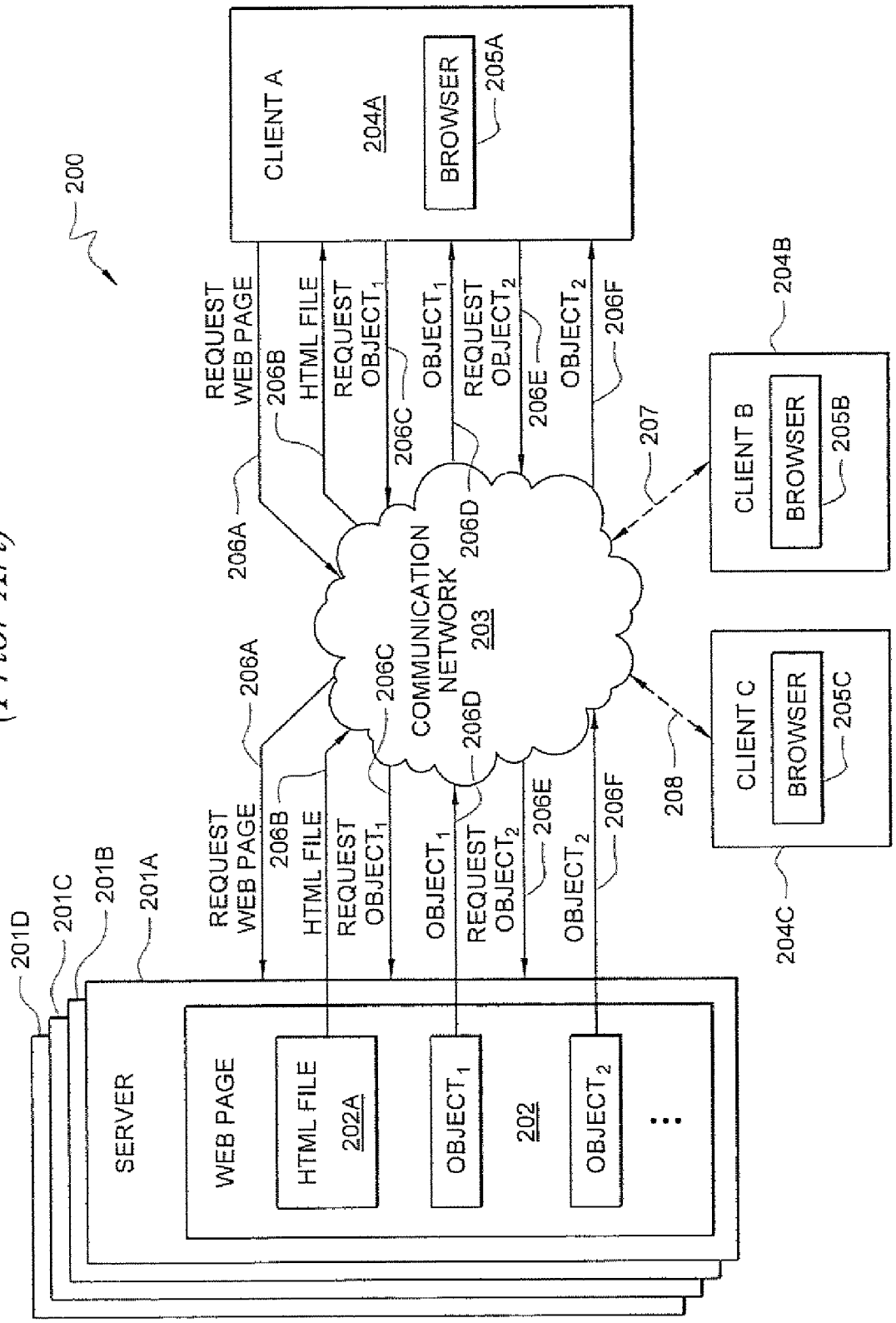
FIG. 2 shows an exemplary client-server system for which embodiments of the present invention may be implemented to analyze.

Turning to FIG. 2, an exemplary client-server system 200 is shown in which certain embodiments of the present invention may be implemented. As shown, one or more servers 201A-201D may provide services (information) to one or more clients, such as clients A-C (labeled 204A-204C, respectively), via communication network 203. Communication network 203 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computers to communicate with each other.

In a preferred embodiment, servers 201A-201D comprise web servers that are utilized to serve up web pages to clients A-C via communication network 203 in a manner as is well known in the art. Accordingly, system 200 of FIG. 2 illustrates an example of servers 201A-201D serving up web pages, such as web page 202, to requesting clients A-C. Of course, embodiments of the present invention are not limited in application to determining resource costs for serving web pages, but may likewise be implemented for determining resource costs for other types of composite transactions. Thus, while various examples are provided herein for determining resource costs for client accesses of web pages, it should be understood that such examples are intended to render the disclosure enabling for determining resource costs associated with various other types of composite transactions.

In the example of FIG. 2, web page 202 comprises an HTML (or other mark-up language) file 202A (which may be referred to herein as a "main page"), and several embedded objects (e.g., images, etc.), such as $Object_1$ and $Object_2$. Techniques for serving up such web page 202 to requesting clients A-C are well known in the art, and therefore such techniques are only briefly described herein. In general, a browser, such as browsers 205A-205C, may be executing at a client computer, such as clients A-C. To retrieve a desired web page 202, the browser issues a series of HTTP requests for all objects of the desired web page. For instance, various client requests and server responses are communicated between client A and server 201A in serving web page 202 to client A, such as requests/responses 206A-206F (referred to collectively herein as requests/responses 206). Requests/responses 206 provide a simplified example of the type of interaction typically involved in serving a desired web page 202 from server 201A to client A. As those of skill in the art will appreciate, requests/responses 206 do not illustrate all interaction that is involved through TCP/IP communication for serving a web page to a client, but rather provides an illustrative example of the general interaction between client A and server 201A in providing web page 202 to client A.

When a client clicks a hypertext link (or otherwise requests a URL) to retrieve a particular web page, the browser first establishes a TCP connection with the web server by sending a SYN packet (not shown in FIG. 2). If the server is ready to process the request, it accepts the connection by sending back a second SYN packet (not shown in FIG. 2) acknowledging the client's SYN. At this point, the client is ready to send HTTP requests 206 to retrieve the HTML file 202A and all embedded objects (e.g., $Object_1$ and $Object_2$), as described below.

First, client A makes an HTTP request 206A to server 201A for web page 202 (e.g., via client A's browser 205A). Such request may be in response to a user inputting the URL for web page 202 or in response to a user clicking on a hyperlink to web page 202, as examples. Server 201A receives the HTTP request 206A and sends HTML file 202A (e.g., file "index.html") of web page 202 to client A via response 206B. HTML file 202A typically identifies the various objects embedded in web page 202, such as $Object_1$ and $Object_2$. Accordingly, upon receiving HTML file 202A, browser 205A requests the identified objects, $Object_1$ and $Object_2$, via requests 206C and 206E. Upon server 201A receiving the requests for such objects, it communicates each object individually to client A via responses 206D and 206F, respectively. As illustrated by the generic example of FIG. 2, each object of a requested web page is retrieved from a server by an individual HTTP request made by the client. Thus, a given client access of web page 202 may comprise a plurality of request/response pairs (or "transactions"), and thus such an access of web page 202 may be referred to herein as a "composite transaction-" For instance, an access of web page 202 is a composite of the request/response pairs for accessing the various objects that make up the web page 202.

Again, the above interactions are simplified to illustrate the general nature of requesting a web page, from which it should be recognized that each object of a web page is requested individually by the requesting client and is, in turn, communicated individually from the server to the requesting client. The above requests/responses 206 may each comprise multiple packets of data. Further, the HTTP requests can, in certain implementations, be sent from a client through one persistent TCP connection with server 201A, or, in other implementations, the requests may be sent through multiple concurrent connections. Server 201A may also be accessed by other clients, such as clients B and C of FIG. 2, and various web page objects may be communicated in a similar manner to those clients through packet communication 207 and 208, respectively.

In many instances, a service provider deploys a web service as a multi-tier client-server application. In such instances, a client typically communicates with the web service via a web interface tier, where the unit of activity at the client-side corresponds to a download of a web page generated by the application. As mentioned above, a web page is generally composed of an HTML file and several embedded objects such as images. A browser retrieves a web page by issuing a series of HTTP requests for all objects: first it retrieves the main HTML file and then after parsing it, the browser retrieves the embedded images. It is very common that a web server and application server reside on the same hardware, and shared resources are used by the application and web servers to generate web pages as well as to retrieve page-embedded objects. In the access logs from Hewlett-Packard's Open View Service Desk (OVSD) application server, for example, there are both types of entries: web page requests and consequent entries for embedded images.

According to one embodiment, the client web page requests, also called web page views, are of interest in determining resource costs 105. Thus, in one embodiment, a web page accessed by the client and generated by the application is considered as a composite transaction, as such web page access includes the various transactions for serving the embedded objects that form such web page.

According to certain embodiments, a service provider collects the server access logs, reflecting processed client requests and client activities at the site. Again, any suitable usage logging applications now known (such as Hewlett-Packard's Open View Service Desk) or later developed, may be used for monitoring the service provider's system and collecting the access logs. According to one embodiment, in the CTRCC 103's analysis, it considers a reduced trace that contains only composite transactions (web page views) as discussed above. All the embedded images, style sheets, and other format-related primitives contained in any composite transactions are omitted, as effectively being absorbed into their respective composite transaction. Moreover, in certain embodiments, the CTRCC 103 further distinguishes a set of unique transaction types and a set of client accesses to them. For static web pages, for example, the URL uniquely defines a file accessed by clients. For dynamic pages, the requests from different users to the same web page URL may appear as requests to different URLs due to the client-specific extension or a corresponding parameter list. Thus, in certain embodiments, the CTRCC 103 carefully filters out these client-specific extensions in the reduced trace.

In certain embodiments, the above-mentioned filtering of transactions to result in a workload that contains composite transactions (eliminating the individual web requests for the objects that form a composite transaction) and containing an identification of a corresponding transaction type of each composite transaction to be analyzed by CTRCC 103, is performed (e.g., by workload profiler 107 and/or some other filtering logic) as part of processing access logs for preparing representative workload subset 108 to be received by CTRCC 103. In this manner; such filtering logic processes the access logs to form the representative workload subset 108 in a form that is convenient for transaction analysis and further processing performed by the CTRCC 103 as described herein. Thus, the representative workload subset 108 shown in FIG. 1 as being received by CTRCC 103 may, in certain embodiments, comprise data that has been previously filtered and organized by workload profiler 107 and/or other filtering logic. In other embodiments, such filtering logic may be included as part of CTRCC 103, wherein CTRCC 103 may receive raw data from access logs and perform the above-mentioned filtering and then the processing for determining the resource costs 105 as described further herein.

Figure 3:
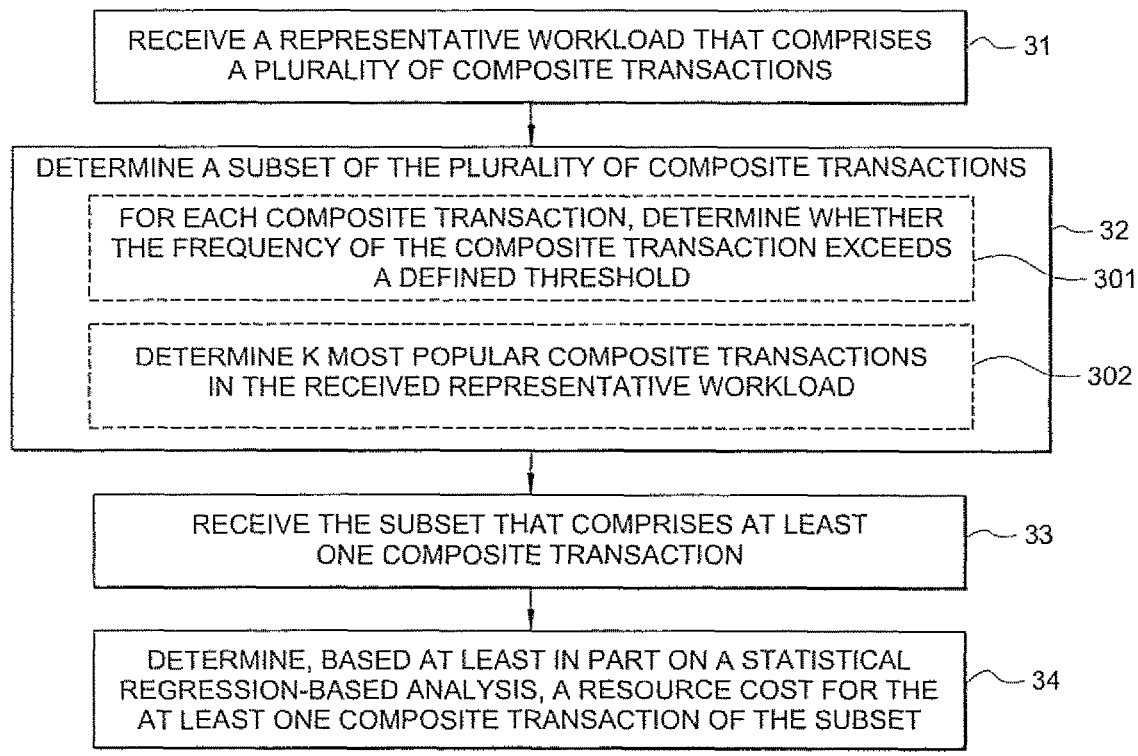
FIG. 3 shows an exemplary operational flow according to an embodiment of the present invention.

FIG. 3 shows an exemplary operational flow according to one embodiment of the present invention. In operational block 31, workload profiler 107 receives a representative workload 101 that a plurality of composite transactions (e.g., composite transactions 102A-102N of FIG. 1). In operational block 32, workload profiler 107 determines a subset of the plurality of composite transactions to use for computing resource costs. Such a determination of the subset of composite transactions may be made in any of many different ways. As one example, in certain embodiments, for each composite transaction in the representative workload 101, workload profiler 107 may determine whether the frequency of the composite transaction exceeds a defined popularity threshold, such as in operational block 301. As another example, in certain embodiments, workload profiler 107 may, such as in block 302, determine the "K" most popular composite transactions in the received representative workload 101, wherein K may be any number such as 10, 15, 20, 50, 100, etc., that is less than the number of different types of composite transactions contained within the received representative workload 101.

In operational block 33, CTRCC 103 receives the determined subset 108 that comprises at least one composite transaction (e.g., composite transactions 109A-109K of FIG. 1). As mentioned above, the representative workload subset 108 may comprise data that represents a representative workload of a computing system under analysis (e.g., represents an actual historical workload of the computing system), and such data may be input in any suitable way to CTRCC 103. For instance CTRCC 103 may read the data from a data structure (e.g., file, database, table, etc.) that is stored to a computer-readable medium, or the data may otherwise be received by CTRCC 103.

In block 34, CTRCC 103 determines, based at least in part on a statistical regression-based analysis (e.g., of regression-based solver 104), a resource cost 105 for the at least one composite transaction of the received subset 108. For instance, as described further herein, a statistical regression-based analysis may be employed by regression-based solver 104 to determine (e.g., estimate) a corresponding resource cost 105 for each composite transaction 109 included in the received subset 108 of representative workload 101.

Figure 4:
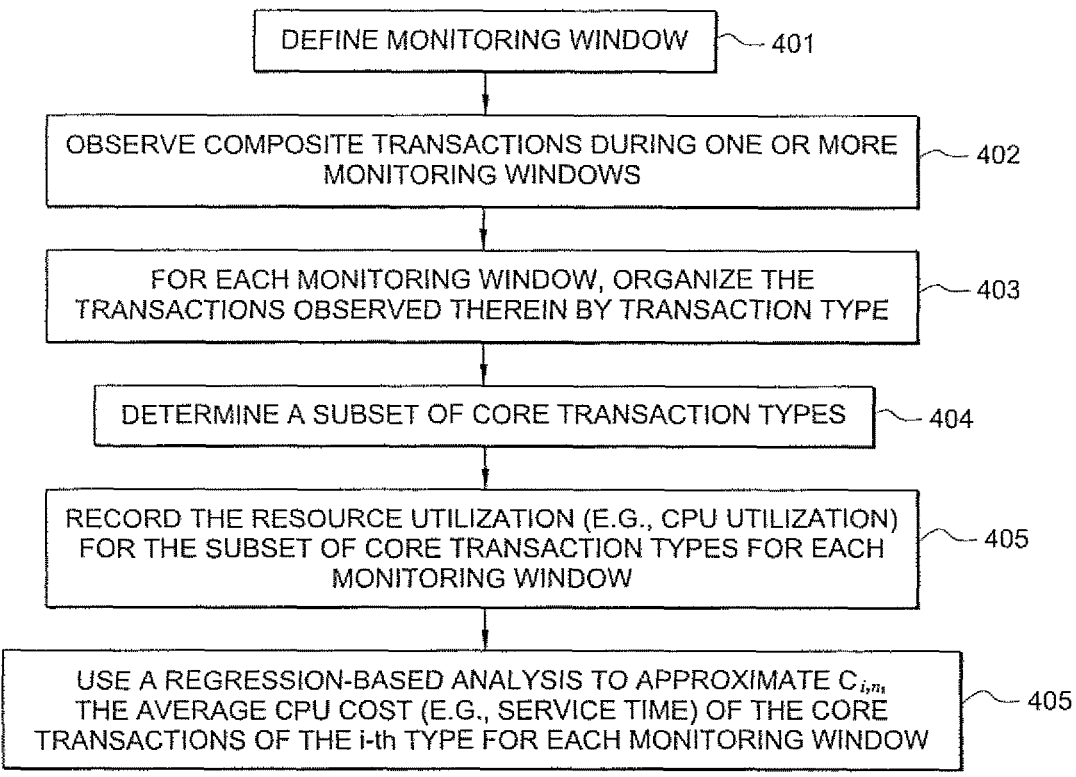
FIG. 4 shows an operational flow of an exemplary statistical regression-based analysis according to one embodiment of the present invention.

An exemplary statistical regression-based analysis that is employed by regression-based solver 104 according to one embodiment of the present invention is now described with reference to FIG. 4. This exemplary regression-based analysis is described for computing CPU costs of a server for serving web pages, and thus according to this exemplary embodiment, a client web page request is considered as the main, basic unit of client/server activity. However, the exemplary regression-based analysis may likewise be employed for computing CPU (and/or other resource) costs associated with serving other types of composite transactions, and thus is not limited in application to analysis of web page accesses.

As mentioned above, often an application server is also responsible for serving the embedded objects of a page (e.g., embedded images, etc.). Thus, it may be desirable for the capacity planning tool 106 to evaluate the overall CPU resources consumed by the application server for corresponding transaction processing, e.g., for generating the requested web page and also retrieving and serving all the embedded objects in the above example. In other words, it may be desirable to evaluate the overall CPU resources utilized by a given tier of a multi-tier architecture (e.g., by the application server of a three-tier architecture) in serving a composite transaction.

There are no common tools for effectively measuring the service times for all these objects, while the accurate CPU consumption estimates are required for capacity planning of the systems operating under real workload mix. While one may build such a tool by explicitly instrumenting the application with additional measurements, this would be an application-dependent and obtrusive solution that might lead to significant overhead, and is thus not used in practice. On the other hand, it should be recognized that embodiments of the present invention described herein are not application dependent and do not require modification of the applications for inclusion of additional logic for explicit instrumentation (and thus do not lead to significant overhead in the operation of the applications for determining resource costs).

According to certain embodiments of the present invention, the exemplary method for determining resource costs of composite transactions, which is based on a statistical regression technique, provides an efficient and simple way to accurately approximate the CPU cost (e.g., overall CPU service time) of different composite transactions. This exemplary method has a unique ability to "rabsorb" some level of uncertainty or noise present in real-world data. Thus, it can be effectively employed for evaluating an actual historical workload of a computing system that is under analysis. As described below, combining the knowledge of critical workload features of a system under analysis with a statistical regression technique provides an elegant and powerful solution for performance evaluation of complex systems with real workloads.

According to this exemplary embodiment, a number of different transactions are observed over fixed-length time intervals, denoted as monitoring windows, in order to capture the changes in user behaviors. Thus, a monitoring window is defined in operational block 401 of FIG. 4, and a number of different composite transactions are observed in one of more of such monitoring windows in operational block 402. The time length of the monitoring window should preferably be selected intelligently. The monitoring window should not be too small (in order to avoid the representative workload contained therein from being too noisy), and the monitoring window should not be too big (in order to avoid overlooking the variance of user activities). In the experiments described herein, we consider 1 hour as a reasonable window length, but the monitoring window length may be determined to be set to some other time period based on the above-mentioned factors.

The transaction mix and system utilization are recorded at the end of each monitoring window, such as shown in the example of Table 1 below. Thus, for each monitoring window, the transactions observed therein are organized by transaction type in block 403, and the resource utilization (e.g., CPU utilization) is recorded for each monitoring window. In general, the different transaction types, refer to different activities/functionalities of the application id/or different web pages related to the site and processed by the service provider's hardware under study. The different transaction types are typically present in the application logs. As an example, one type of transaction for a banking application may be a transaction in which a client views his account balance, while a client transferring funds between accounts might be a second transaction type of the banking application.

TABLE 1

An example of transaction profile in machine 1

| Time (hour) | $N_1$ | $N_2$ | $N_3$ | $N_4$ | ... | $N_{756}$ | $U_{CPU}$ (%) |
|---|---|---|---|---|---|---|---|
| 1 | 21 | 15 | 21 | 16 | ... | 0 | 13.3201 |
| 2 | 24 | 6 | 8 | 5 | ... | 0 | 8.4306 |
| 3 | 18 | 2 | 5 | 4 | ... | 0 | 7.4107 |
| 4 | 22 | 2 | 4 | 7 | ... | 0 | 6.4274 |
| 5 | 38 | 5 | 6 | 7 | ... | 0 | 7.5458 |
| ... | | | | | | | |

In the example of Table 1, 5 monitoring windows are shown that are each 1 hour in length. In each monitoring window, the number of transactions of a given type are recorded, wherein one or more of the transaction types may be composite transactions. For instance, in the example of Table 1, there are 756 different types of transactions, and the number of occurrences of each transaction type within each monitoring window is recorded. Also, the CPU utilization of each monitoring window is recorded. For instance, the CPU of the system under analysis was utilized 13.3201% of the 1-hour period of the first monitoring window shown in Table 1. As described further below with reference to Table 2, in operational block 404, a subset of core transaction types may be determined by workload profiler 107, and the resource utilization (e.g., CPU utilization) for the determined subset of core transaction types is recorded for each monitoring window.

As an exemplary application of this representative embodiment, let us assume that there are a total of it transaction types processed by the server (or other computing system) under analysis. Let us use the following denotations:

T is the length of the monitoring window;

$N_i$ is the number of transactions of the i-th type, where $1 \leq i \leq M$;

$U_{CPU,n}$ is the average CPU utilization during this monitoring window at the n-th tier of an application;

$D_{i,n}$ is the average service time of transactions of the i-th type at the n-th tier where $1 \leq i \leq M$; and $D_{0,n}$ is the average CPU overhead related to "keeping the system up" activities at the n-th tier. For example, there are generally some OS processes and/or background jobs that consume CPU time even when there is no transaction to be serviced in the system. Thus, $D_0$ can be defined to represent such overhead that is typically present in the system under analysis.

From the utilization law, Equation (1) below can be obtained for each of the monitoring windows.

$$D_{0,n} + \sum_i N_i \cdot D_{i,n} = U_{CPU,n} \cdot T. \quad (1)$$

It is practically infeasible to get accurate service times $D_{i,n}$ because this is an overconstrained problem. That is, the exact solution (accurate service times) is feasible for M number of equations with M unknowns (variables). In the above analysis, on the other hand, there are N number of equations where N>K, and is thus an overconstrained problem, wherein it becomes desirable to find art approximate solution that leads to a small error. Since it is practically infeasible to get accurate service times $D_{i,n}$ we let $C_{i,n}$ denote the approximated CPU cost of $D_{i,n}$ for $1 \leq i \leq M$. Then an approximated utilization $U'_{CPU,n}$ can be calculated as ("Equation (2)"):

$$U'_{CPU,n} = \frac{C_{0,n} + \sum_i N_i \cdot C_{i,n}}{T}.$$

A statistical regression-based analysis may be employed to solve for $C_{i,n}$. Thus, in operational block 406 of FIG. 4, a regression-based analysis is used to approximate $C_{i,n}$ to determine the average CPU cost of the core transactions of the i-th type for each monitoring window. According to certain embodiments, to solve for $C_{i,n}$, one ca choose a regression method from a variety of known methods in the literature, such as the regression methods described in "Algorithms" by R. Sedgewick, Addison-Wesley Publishing Company, Second Edition (see e.g. description beginning at page 551 thereof), the disclosure of which is hereby incorporated herein by reference. A typical objective for a regression method is to minimize either the absolute error:

$$\sum_j |U'_{CPU,n} - U_{CPU,n}|_j$$

or the squared error:

$$\sum_j (U'_{CPU,n} - U_{CPU,n})_j^2,$$

where j is the index of the monitoring window over time.

Finding the best fitting method is outside the scope of this disclosure, and is not described in great detail so as not to unnecessarily detract attention away from the invention. Although, as one example, in some of our experiments we use the Non-negative Least Squares Regression (Non-negative LSQ) provided by MATLAB to get $C_{i,n}$. This non-negative LSQ regression is to minimize the error $$e = \sum_j (U'_{CPU,n} - U_{CPU,n})_j^2$$

such that $C_{i,n} \geq 0$.

The exemplary statistical regression-based analysis proposed above works very well for estimating the CPU demands of composite transactions that themselves might represent a collection of smaller objects, whereas direct measurement methods (e.g., explicitly instrumenting the application under analysis with additional measurements) are not practical, as discussed above.

Finding a solution for a large number of equations with many (e.g., 1000) variables leads to a high complexity of regression method and requires a high computing time. Workload studies have shown that web workloads typically exhibit a very high degree of reference locality, i.e., a small subset of site transactions is responsible for a very high percentage of client accesses. So, a question arises regarding whether accurate performance results can be obtained by approximating the resource cost (e.g., CPU cost) of a much smaller set of popular transactions, which may be referred to herein as "core" transactions. In other words, if the above-described regression method is used to find the CPU cost of a small number of core composite transactions, can this small set be useful for an accurate evaluation of the future CPU demands in the system?

Following this idea, according to certain embodiments of the present invention, we only use the columns $N_i$ to $N_k$ and $U_{cpu,n}$ in Table 1 to approximate $C_{i,n}$ for $1 \leq i \leq N$ as shown in Table 2. Workload profiler 107 may employ techniques as described further herein for determining the reduced subset of transactions $N_i$ to $N_k$ that are used in this analysis. The approximated $U'_{CPU,n}$ of every hour is then computed by these $N_i$ to $N_k$ and $C_{i,n}$ to $C_{k,n}$ values.

TABLE 2

| Time (hour) | $N_1$ | $N_2$ | $N_3$ | $N_4$ | ... | $N_K$ | $U_{CPU}$(%) |
|---|---|---|---|---|---|---|---|
| 1 | 21 | 15 | 21 | 16 | ... | 0 | 13.3201 |
| 2 | 24 | 6 | 8 | 5 | ... | 0 | 8.4306 |
| 3 | 18 | 2 | 5 | 4 | ... | 0 | 7.4107 |

TABLE 2-continued

| Time (hour) | $N_1$ | $N_2$ | $N_3$ | $N_4$ | ... | $N_K$ | $U_{CPU}$ (%) |
|---|---|---|---|---|---|---|---|
| 4 | 22 | 2 | 4 | 7 | ... | 0 | 6.4274 |
| 5 | 38 | 5 | 6 | 7 | ... | 0 | 7.5458 |
| ... | | | | | | | |

Thus, as shown in operational block 404, such a subset of K core transaction types are determined by workload profiler 107, and the regression-based analysis is performed in operational block 406 to approximate $C_{i,n}$ for the K core transaction types. In this manner, the composite transactions of the most popular transaction types of a representative workload may be heavily relied upon for performing the capacity planning analysis of a computing system, which may improve computing efficiency and/or lead to increased accuracy in capacity planning results, as discussed above.

While the above description has concentrated on evaluating the CPU capacity required for support of a given workload, application of the concepts described herein are not limited to determining such CPU costs. Rather, the regression-based analysis methods described herein may likewise be efficiently applied for evaluating other shared system resources that have an "additive" capacity nature. As one example, embodiments of the present invention may be applied for estimating the latency of the different links on the network path when end-to-end measurements are given but the link's delay of the path is unknown. As another example, the above-described embodiments may be employed for evaluating transactions' memory usage estimates.

Figure 5:
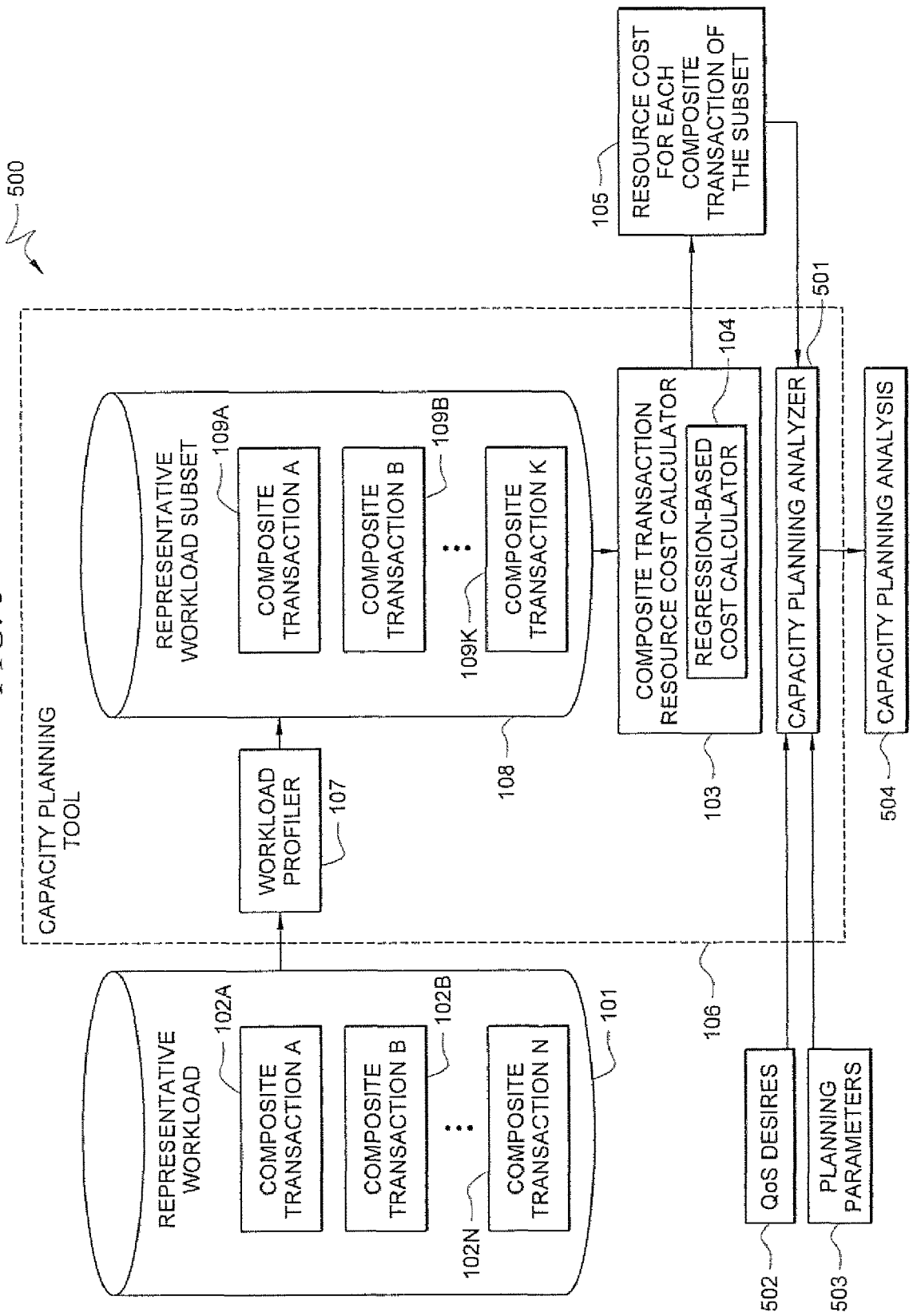
FIG. 5 shows another exemplary system of an embodiment of the present invention, wherein determined resource costs are used for capacity analysis of a computing system.

In certain embodiments, once the resource cost 105 for composite transactions is determined, such resource cost may be used for further analysis, such as for answering capacity planning questions about a system under analysis. For instance, FIG. 5 shows an exemplary system 500 which may be employed for using determined resource costs 105. As with system 100 of FIG. 1, system 500 includes workload profiler 107 for receiving representative workload 101 and determining subset 108 that comprises composite transactions 109. System 500 also comprises CTRCC 103 having regression-based solver 104 for receiving subset 108 and determining resource costs 105 for composite transactions 109 in the manner described above. In this example, capacity planning tool 106 may further comprise capacity planning analyzer 501, which may receive the determined resource costs 105 and further analyze the capacity of the system under analysis. For instance, in certain embodiments, capacity planning analyzer 501 may also receive input (e.g., from a user) indicating Qos desires 502. Such QoS desires 502 may specify, for example, a target QoS that is desired to be provided by the service provider, such as serving web pages to clients with response times no longer than 8 seconds. Capacity planning analyzer 501 may also receive certain planning parameters 503, which may specify a desired modification to the workload of the service provider. For instance, planning parameter 503 may specify an additional number of clients desired to be supported by the service provider. In this manner, the capacity planning analyzer 501 may analyze the received resource costs 105 determined for the representative workload 101 to answer such capacity planning questions that a service provider may have as:

how many additional clients can be supported by the existing system i) while still providing the same performance guarantees (QoS desires 502), e.g., response time under 8 seconds, and ii) assuming that new clients perform similar activities as already existing clients in the system, i.e., the system processes the same type of workload?

does the existing system have enough available capacity for processing an additional service for N number of clients (defined by planning parameters 503) where the client activities and behaviors are specified as a well-defined subset of the current system activities?

if the current client population doubles, then what is the expected system response time?

The answers to such questions and/or other capacity planning information may be determined by capacity planning analyzer 501 and output as capacity planning analysis 504. Thus, the determined resource costs 105 may be used to perform further analysis, such as for analyzing the capacity of the computing system under analysis by capacity planning analyzer 501, such as described further in co-pending and commonly assigned U.S. patent application Ser. No. 11/684,569 entitled "SYSTEM AND METHOD FOR CAPACITY PLANNING FOR COMPUTING SYSTEMS", the disclosure of which is incorporated herein by reference.

To validate the above-described approach that uses a subset 108 of most popular composite transactions from a representative workload 101, a validation analysis was performed using 1-month long access logs from two heterogeneous application servers that provide customized client access to a popular and actively used HP service: Open View Service Desk (OVSD). In this exemplary validation analysis, we considered a reduced trace that contained only composite transactions (web page views) as discussed above, wherein we omitted all embedded images, style sheets, and other format-related primitives. Moreover, we further distinguished a set of unique transaction types and a set of client accesses to them. For static web pages, the URL uniquely defines a file accessed by clients. For dynamic pages the requests from different users to the same web page URL may appear as requests to different; URLs due to the client-specific extension or a corresponding parameter list. Thus, we carefully filtered out these client-specific extensions in the reduced trace. In this example, there were 984,505 transactions in the reduced trace. Overall, in the reduced trace, there were 756 different unique transactions (or transaction types).

In this exemplary validation analysis, we further ordered different transaction types by number of client accesses (i.e., transactions were ranked by their respective popularity). The transaction with rank 1 represents the most popular transaction type. The studied workload exhibited a very high degree of reference locality: i.e., a small subset of site transactions is responsible for a very high percentage of client accesses, e.g.:

the most popular (rank 1) transaction type is responsible for 30.9% of the total accesses;

the top 5 transaction types accumulate 61.1% of all the client accesses;

the top 10 transaction types accumulate 79.1% of all the client accesses;

the top 20 transaction types are responsible for 93.6% of the site accesses; and the top 100 transaction types account for 99.8% of all the site accesses.

For sensitivity analysis, we considered the results produced by the exemplary above-described non-negative LSQ regression method when K is equal to 10, 20, 60 and 100 transactions respectively. That is, we considered most popular subsets containing 10, 20, 60, and 100 of the most popular composite transactions present in the representative workload, respectively.

We used the relative error of the approximated utilization as the metric to validate the regression accuracy. For every hour, the relative error of the approximated utilization is defined as:

$$Error_R = \frac{|U'_{CPU} - U_{CPU}|}{U_{CPU}}.$$

We divided the OVSD) trace into two pails. The first half was used as a training set to solve for the CPU cost $C_i$ using the non-negative LSQ regression method. The second half was considered as a validating set. Note that the administration jobs during weekends might introduce a significant noise to the CPU utilization as explained before. Thus, the training set for the regression was composed of the data from the workday only, in this example.

Figure 6A:
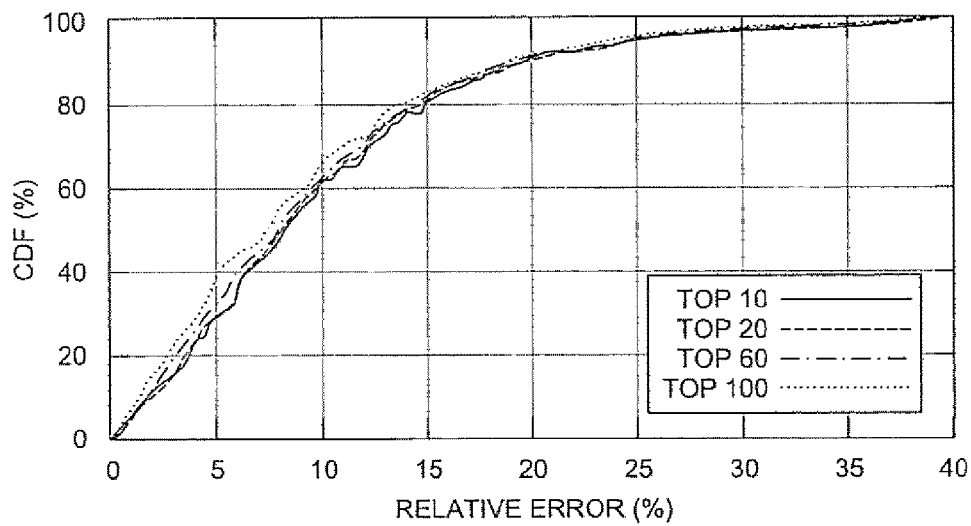
FIG. 6A shows a graph illustrating CDF of related errors under different number of core transactions chosen for a regression method for a training set for the first machine under study in an exemplary validation study.
Figure 6B:
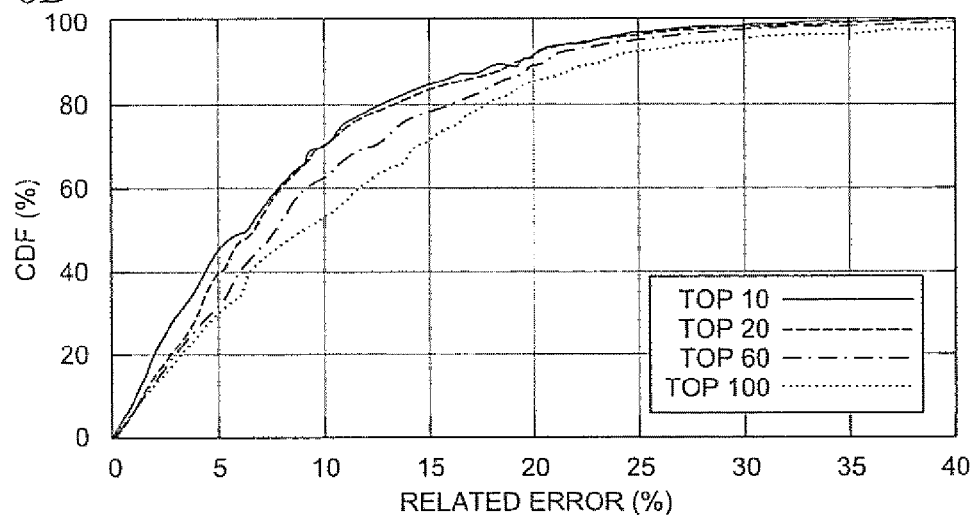
FIG. 6B shows a graph illustrating CDF of related errors under different number of core transactions chosen for a regression method for a validating set for the first machine under study in the exemplary validation study.
Figure 7A:
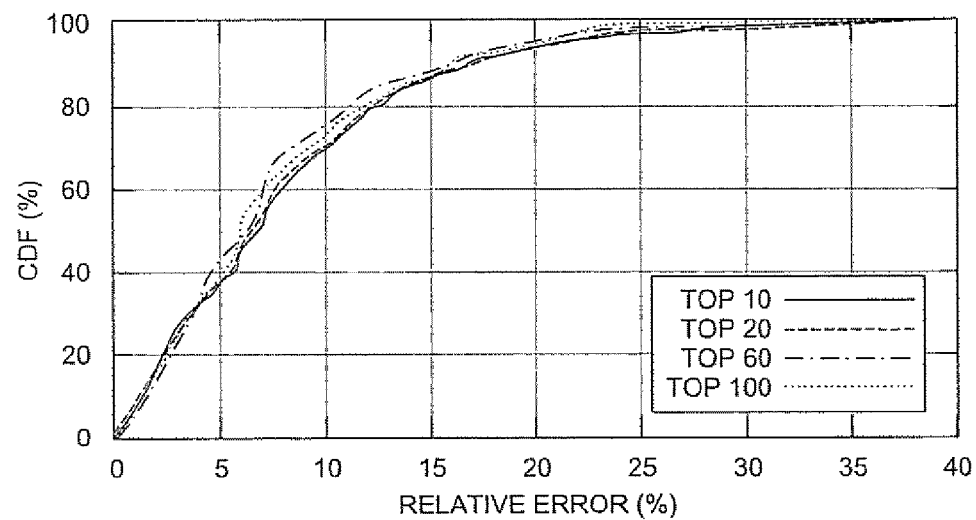
FIG. 7A shows a graph illustrating CDF of related errors under different number of core transactions chosen for a regression method for a training set for the second machine under study in the exemplary validation study.
Figure 7B:
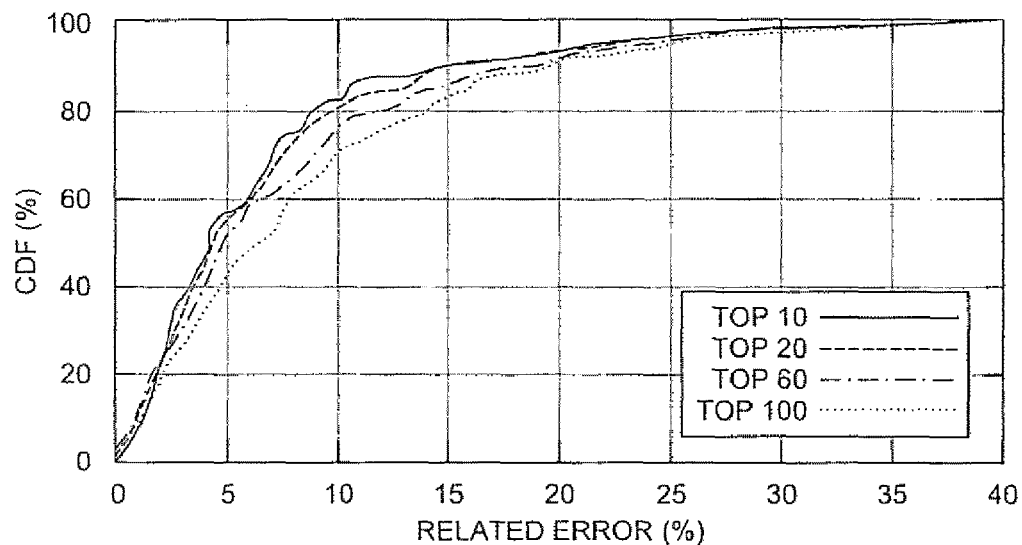
FIG. 7B slows a graph illustrating CDF of related errors under different number of core transactions chosen for a regression method for a validating set for the second machine under study in the exemplary validation study.

The regression method produced similar results for both heterogeneous machines under study. FIGS. 6A-6B and 7A-7B show the CDF of the relative errors for training and validating sets for machines 1, 2 respectively. That is, FIG. 6A shows a graph illustrating CDF of related errors under different number of core transactions chosen for a regression method for a training set for the first machine under study, while FIG. 6B shows a graph illustrating CDF of related errors under different number of core transactions chosen for a regression method for a validating set for the first machine under study. Similarly, FIG. 7A shows a graph illustrating CDF of related errors under different number of core transactions chosen for a regression method for a training set for the second machine under study, while FIG. 7B shows a graph illustrating CDF of related errors under different number of core transactions chosen for a regression method for a validating set for the second machine under study.

The results we obtained in this exemplary validation analysis are now briefly discussed. Overall, the non-negative LSQ regression achieves good results for all examined values of K, i.e., when the regression method is applied to approximate the CPU cost of the top 10, 20, 60, or 100 most popular transactions. For the training set, at least 60% of the points have relative errors less than 10%, and at least 90% of the points have relative errors less than 20% as shown in FIGS. 6A and 7A. The method's accuracy for the validating set is only slightly worse as shown in FIGS. 6B and 7B. A larger K appears to achieve a higher accuracy for the training set. However, the improvement is not significant: for K=100 in this example we see only 4% of that compared to the results with the top 10 transactions. The larger values of K, e.g., K=100, show a worse prediction accuracy for the validating set compared to K equal to 10 or 20 core transactions as shown in FIGS. 6-7. These results again can be explained by the workload properties. While we consider 100 most popular transactions, the last 80 of them only contribute to 6% of all client requests. These transactions have irregular and unstationary access pattern. Some of those transactions appear only in the first or second half of the trace In this situation, computing the individual cost of these transactions does lot help to evaluate the future CPU demands, and introduces a higher error compared to the regression results based on a smaller transaction set.

The exemplary regression method analysis in this validation produced the best results when a stable set of core transactions is used, and rarely-accessed transactions are omitted. This method has a unique ability to "absorb" some level of uncertainty or noise present in real-world data. The additional CPU overhead that is due to the rarely accessed transactions is "absorbed" by the CPU cost of the core transactions. In such a way a small, consistent CPU usage by the distinct and rarely accessed transactions is accounted via the CPU cost of the most frequently and consistently accessed core transactions.

We demonstrate that combining the knowledge of critical workload features with statistical regression technique provides an elegant and powerful solution for performance evaluation of complex production systems with real workloads. Consequently, we find that considering top 20 core transactions (i.e., K=20) in the regression method and in predicting future system performance lead to the most accurate results in this exemplary analysis. Note that the top 20 transactions are responsible for 93.6% of the total transactions in the analyzed trace. Thus, selecting the top K transactions that account for 90%-95% of all client accesses for the regression method provides a good guidance in general. According to certain embodiments of the present invention, the above validation techniques may be employed (e.g., by workload profiler 107) to arrive at an appropriate K value for use in analyzing other computing systems, wherein the value determined for K may differ from that arrived at in the above exemplary analysis.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 8:
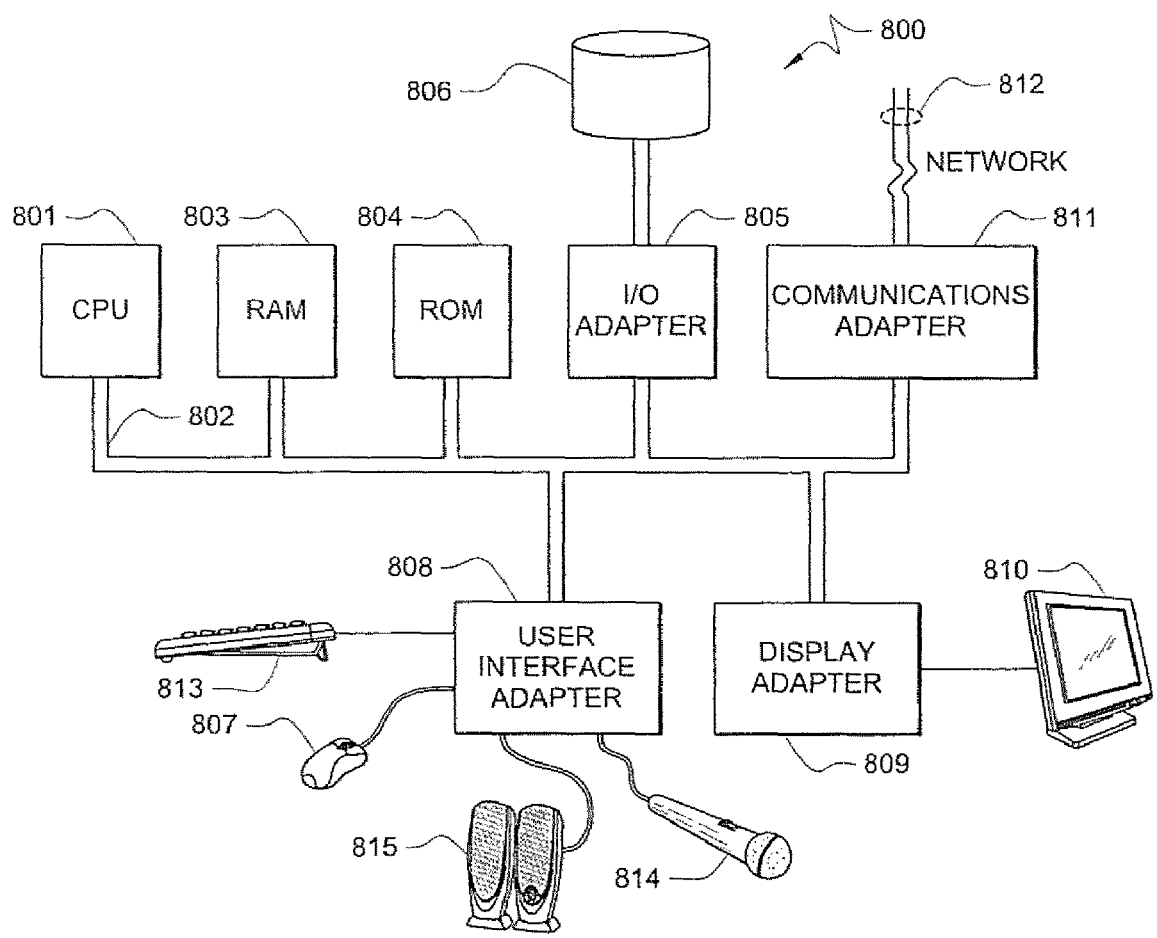
FIG. 8 shows an exemplary system on which a resource cost calculator may be implemented according to one embodiment of the present invention.

FIG. 8 illustrates an exemplary computer system 800 on which the workload profiler 167, CTRCC 103 (and/or capacity planning tool 106) may be implemented according to one embodiment of the present invention. Central processing unit (CPU) 801 is coupled to system bus 802. CPU 801 may be any general-purpose CPU. The present invention is not restricted by the architecture of CPU 801 (or other components of exemplary system 800) as long as CPU 801 (and other components of system 800) supports the inventive operations as described herein. CPU 801 may execute the various logical instructions according to embodiments of the present invention. For example, CPU 801 may execute machine-level instructions according to the exemplary operational flows described above in conjunction with FIGS. 3 and 4.

Computer system 800 also preferably includes random access memory (RAM) 803, which may be SRAM, DRAM, SDRAM, or the like. Computer system 800 preferably includes read-only memory (ROM) 804 which may be PROM, EPROM, EEPROM, or the like. RAM 803 and ROM 804 hold user and system data and programs, as is well known in the art.

Computer system 800 also preferably includes input output (I/O) adapter 805, communications adapter 811, user interface adapter 808, and display adapter 809. I/O adapter 805, user interface adapter 808, and/or communication-s adapter 811 may, in certain embodiments, enable a user to interact with computer system 800 in order to input information, such as QoS desires 502 and/or planning parameters 503 of a service provider.

I/O adapter 805 preferably connects to storage device(s) 806, such as one or more of hard drive, compact disc (CD) drive, floppy disk drive, tape drive, etc. to computer system 800. The storage devices may be utilized when MM 803 is insufficient for the memory requirements associated with storing data for operations of the workload profiler 107 and/or CTRCC 103 (e.g., representative workload 101, subset 108, and/or values of the variables computed according the exemplary embodiment described in connection with FIG. 4). Communications adapter 811 is preferably adapted to couple computer system 800 to network 812, which may enable information to be input to and/or output from system 800 via such network 812 (e.g., the Internet or other wide-area network, a local-area network, a public or private switched telephony network, a wireless network, any combination of the foregoing). For instance, a representative workload 101 may be input to system 800 via network 812 from a remote computer (e.g., from the computing system under analysis), and/or a determined resource cost 105 may be output and communicated via network 812 to a remote computer. User interface adapter 808 couples user input devices, such as keyboard 813, pointing device 807, and microphone 814 and/or output devices, such as speaker(s) 815 to computer system 800. Display adapter 809 is driven by CPU 801 to control the display on display device 810 to, for example, display information regarding the determined resource cost 105 and/or capacity planning analysis 504 according to certain embodiments of the present invention.

It shall be appreciated that the present invention is not limited to the architecture of system 800. For example, any suitable processor-based device may be utilized for implementing workload profiler 107 and/or CTRCC 103, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method comprising:
   receiving, by a computing device having a computer processor and computer-readable code stored on a computer-readable medium and executable by the computer processor, a representative workload of a computing system, said representative workload comprising a plurality of composite transaction;
   determining, by the computing device, a subset of the plurality of composite transactions for which a corresponding resource cost is to be determined, said subset comprising at least one of the plurality of composite transactions;
   determining, by the computing device, based at least in part on a statistical regression-based analysis, a resource cost for the at least one composite transaction in the determined subset, said resource cost for the at least one composite transaction in the determined subset, said resource cost reflecting an amount of utilization of at least one resource of the computing system in serving the at least one composite transaction in the determined subset, wherein the statistical regression-based analysis includes determining an approximate utilization of the at least one resource using a length of a monitoring window during which transactions of a type of the at least one composite transaction in the determined subset, and an approximated average service time of the number of composite transactions of the type of the at least one composite transaction in the determined subject; and
   analyzing a capacity of the computing system using the determined resource cost;
   wherein determining the subset comprises determining a subset of most popular transactions in the representative workload.

2. The method of claim 1 wherein said most popular transactions comprise transactions that occur most frequently in the representative workload.

3. The method of claim 1 wherein said determining the subset comprises:
   determining K most popular composite transactions in the representative workload, wherein K is a number that is at least 1 and that is less than a total number of said plurality of composite transactions in the representative workload.

4. The method of claim 3 further comprising:
   determining said number K based at least in part on an analysis of said representative workload and resource utilization of said computing system.

5. The method of claim 4 wherein said K comprises a number of said most popular composite transactions in the representative workload that account for a defined threshold amount of resource utilization of said computing system.

6. The method of claim 1 wherein said determining the subset comprises:
   determining K most popular composite transaction types in the representative workload, wherein K is a number that is at least 1 and that is less than a total number of composite transaction types included in the representative workload.

7. The method of claim 6 wherein said determining said resource cost comprises:
   determining said resource cost for composite transactions included in the representative workload that are of the determined K most popular composite transaction types.

8. The method of claim 1 wherein said receiving comprises receiving said representative workload by workload profile logic; and wherein said determining said subset comprises determining said subset by said workload profile logic.

9. The method of claim 8 wherein said workload profile logic comprises computer-executable software code stored to a computer-readable medium.

10. The method of claim 1 wherein said statistical regression-based analysis comprises:
    determining an approximate utilization ($U'_{CPU,n}$) as:

$$U'_{CPU,n} = \frac{C_{0,n} + \sum_i N_i \cdot C_{i,n}}{T};$$

wherein T is a length of a monitoring window during which transactions served by the computing system are monitored; $U'_{CPU,n}$ is an approximation of the average CPU utilization of the computing system during the monitoring window at the n-th tier of an application hosted by the computing system, wherein n comprises at least one tier; $N_i$ is a number of composite transactions of an i-th type of composite transactions, where $1 \leq i \leq M$; and $C_{i,n}$ denotes an approximated average service time of said composite transactions of the i-th type at the n-th tier.

11. A device comprising:
    a memory; and
    a processor coupled to the memory, wherein the processor is configured to:
    receive a representative workload of a computing system, said representative workload comprising a plurality of composite transactions;

determine a subset of the plurality of composite transactions for which a corresponding resource cost is to be determined, said subset comprising K most popular composite transaction types in the representative workload, wherein K is a number that is at least 1 and that is less than a total number of composite transaction types included in the representative workload;

determine, based at least in part on statistical regression-based analysis, a resource cost for the K most popular composite transaction types in the determined subset, said resource cost reflecting an amount of utilization of at least one resource of the computing system in serving the K most popular composite transaction types in the determined subset, wherein the statistical regression-based analysis includes determining an approximate utilization of the at least one resource using a length of a monitoring window during which transactions served by the computing system are monitored, a number of composite transactions of a type of the K most popular composite transaction types in the determined subset, and an approximated average service time of the number of composite transactions of the type of the K most popular composite transaction types in the determined subset; and analyze a capacity of the computing system using the determined resource cost.

12. The device of claim 11, wherein:
the processor is configured to receive the K most popular composite transaction types in the determined subset.

13. The device of claim 11 wherein said K comprises a number of said most popular composite transaction types in the representative workload that account for a defined threshold amount of resource utilization of said computing system.

14. A method comprising:
receiving, by a computing device having a computer processor and computer-readable code stored on a computer-readable medium and executable by the computer processor, a representative workload of a computing system, said representative workload comprising a plurality of composite transactions;
determining, by the computing device, a subset of the plurality of composite transactions, said subset comprising at least one of the plurality of composite transactions;
receiving, by the computing device, the determined subset of the plurality of composite transactions;
determining, by the computing device, based at least in part on statistical regression-based analysis, a resource cost for the at least one composite transaction in the determined subset, said resource cost reflecting an amount of utilization of at least one resource of the computing system in serving the at least one composite transaction in the determined subset, wherein the statistical regression-based analysis includes determining an approximate utilization of the at least one resource using a length of a monitoring window during which transactions served by the computing system are monitored, a number of composite transactions of a type of the at least one composite transaction in the determined subset, and an approximated average service time of the number of composite transactions of the type of the at least one composite transaction in the determined subject; and
analyzing a capacity of the computing system using the determined resource cost;
wherein determining the subset comprises determining a subset of most popular transactions in the representative workload.

15. The method of claim 14 wherein said determining the subset comprises:
determining K most popular composite transactions in the representative workload, and wherein said K comprises a number of said most popular composite transactions in the representative workload that account for a defined threshold amount of resource utilization of said computing system, and wherein K is a number that is at least 1 and that is less than a total number of said plurality of composite transactions in the representative workload.

16. The method of claim 14 wherein said determining the subset comprises:
determining K most popular composite transaction types in the representative workload, wherein K is a number that is at least 1 and that is less than a total number of composite transaction types included in the representative workload.

17. The method of claim 16 wherein said determining said resource cost comprises:
determining said resource cost for composite transactions included in the representative workload that are of the determined K most popular composite transaction types.

18. The method of claim 14 wherein said representative workload comprises data reflecting a historical workload of said computing system.

19. The method of claim 14 wherein said statistical regression-based analysis comprises:
determining an approximate utilization ($U'_{CPU,n}$) as:

$$U'_{CPU,n} = \frac{C_{0,n} + \sum_i N_i \cdot C_{i,n}}{T};$$

wherein T is a length of a monitoring window during which transactions served by the computing system are monitored; $U'_{CPU,n}$ is an approximation of the average CPU utilization of the computing system during the monitoring window at the n-th tier of an application hosted by the computing system, wherein n comprises at least one tier; $N_i$ is a number of composite transactions of an i-th type of composite transactions, where $1 \leq i \leq M$; and $C_{i,n}$ denotes an approximated average service time of said composite transactions of the i-th type at the n-th tier.

* * * * *

UNITED STATES PATENT AND TRADEMARK OFFICE
CERTIFICATE OF CORRECTION

PATENT NO. : 7,779,127 B2
APPLICATION NO. : 11/684567
DATED : August 17, 2010
INVENTOR(S) : Ludmila Cherkasova et al.

It is certified that error appears in the above-identified patent and that said Letters Patent is hereby corrected as shown below:

On the title page, in item (54), Title, in column 1, line 4, delete "DETERMING" and insert -- DETERMINING --, therefor.

In column 1, line 4, delete "DETERMING" and insert -- DETERMINING --, therefor.

Signed and Sealed this
Fourth Day of January, 2011

David J. Kappos
*Director of the United States Patent and Trademark Office*